US006422803B1

(12) United States Patent
Adams

(10) Patent No.: US 6,422,803 B1
(45) Date of Patent: *Jul. 23, 2002

(54) DISCHARGE SYSTEM WITH DUAL DOORS AND INTERMEDIATE AUGER

(75) Inventor: William Wesley Adams, Dewitt, AR (US)

(73) Assignee: Industrial Ironworks, Inc., DeWitt, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/544,536

(22) Filed: Apr. 6, 2000

Related U.S. Application Data

(62) Division of application No. 09/086,691, filed on May 28, 1998, now Pat. No. 6,129,499.

(51) Int. Cl.[7] .................................................. B60P 1/40
(52) U.S. Cl. ........................ 414/505; 414/520; 414/526
(58) Field of Search .......................... 198/530; 414/328, 414/520, 526, 504, 505

(56) References Cited

U.S. PATENT DOCUMENTS

| | | | | |
|---|---|---|---|---|
| 481,958 A | * | 9/1892 | Krause | 198/530 X |
| 1,885,656 A | * | 11/1932 | Wallace | 198/530 |
| 2,386,991 A | * | 10/1945 | Thomes | 198/530 X |
| 2,585,169 A | | 2/1952 | Potter | |
| 2,877,914 A | | 3/1959 | Herr | |
| 3,322,257 A | | 5/1967 | Phillips | 198/119 |
| 3,326,397 A | * | 6/1967 | Lippmann et al. | |
| 3,391,778 A | | 7/1968 | Lasiter | 198/64 |
| 3,638,816 A | | 2/1972 | Mann | |
| 3,642,155 A | | 2/1972 | Carlson | |
| 3,770,101 A | | 11/1973 | Carlson | 198/115 |
| 3,938,861 A | | 2/1976 | Bagwell | 298/27 |
| 4,009,906 A | | 3/1977 | Sweet et al. | 298/27 |

(List continued on next page.)

FOREIGN PATENT DOCUMENTS

GB 2216094 10/1989

OTHER PUBLICATIONS

Adams 1200 Super Tender . . . Always Looking to the Future, Industrial Iron Works, DeWitt, AR.

*Primary Examiner*—Janice L. Krizek
(74) *Attorney, Agent, or Firm*—Head, Johnson & Kachigian

(57) ABSTRACT

A discharge system with dual doors and an intermediate auger for dispensing materials from a storage receptacle either beneath the receptacle or remotely. The operator may select to discharge stored materials beneath the receptacle by opening an upper door and lower door to permit gravitational discharge from the receptacle. An intermediate auger is remotely coupled to an auger system for remote discharge. The auger system comprises two discrete sections selectively coupled by a pivot assembly. During coupling, the second section arcuately moves from a stowed position into a discharge position wherein receptive contact is established with the first section. The first section comprises an elongated conveyor disposed between the upper and lower doors to receive dispensed materials for subsequent output adjacent the trailer periphery. The conveyor comprises a cylindrical housing supporting a terminal hydraulic motor that rotates an internal screw auger to propel dispensed particulate material inside the transporter to an output orifice for transfer into the second section for external delivery. The second section comprises an auger transporter that comprises a cylindrical housing supporting a terminal motor rotating an internal screw auger that propels materials therethrough to an external discharge spout. The pivot assembly comprises a reinforcing sleeve that circumscribes an intermediate portion of the auger transporter to secure a hydraulic cylinder and a hinge thereto. The cylinder and hinge are oppositely anchored to the frame in proximity. The hinge comprises a sleeve circumscribing collar defining an integral base that is journalled between an upper trunnion and a lower trunnion by a roll pin. The sleeve comprises a rigid cylinder that concentrically extends along a portion of the auger transporter and is secured thereto.

4 Claims, 6 Drawing Sheets

U.S. PATENT DOCUMENTS

| | | |
|---|---|---|
| 4,119,223 A | 10/1978 | Fiechter |
| 4,218,169 A | 8/1980 | Arends ........................ 414/523 |
| 4,419,037 A | 12/1983 | Niewold ...................... 414/489 |
| 4,427,105 A | 1/1984 | Hawley et al. ............. 198/632 |
| 4,459,079 A | 7/1984 | Brelsford et al. ........... 414/505 |
| 4,475,672 A | 10/1984 | Whitehead .................. 222/561 |
| 4,613,275 A | 9/1986 | Karlowsky .................. 414/489 |
| 4,617,868 A | 10/1986 | Wahlstrom et al. ......... 105/282 |
| 4,742,938 A | 5/1988 | Niewold ...................... 222/381 |
| 5,108,249 A | 4/1992 | Kinzenbaw et al. ........ 414/523 |
| 5,224,761 A | 7/1993 | Hagenbuch .................. 298/28 |
| 5,395,058 A | 3/1995 | Doyle ......................... 241/73 |
| 5,409,344 A | 4/1995 | Tharaldson .................. 414/505 |
| 5,468,113 A | 11/1995 | Davis .......................... 414/523 |
| 5,516,253 A | 5/1996 | Linscheid et al. .......... 414/519 |
| 5,520,495 A | 5/1996 | Sukup ......................... 414/523 |
| 5,529,455 A | 6/1996 | Kaster et al. ................ 414/523 |
| 5,538,388 A | 7/1996 | Bergkamp et al. .......... 414/523 |
| 5,615,990 A | 4/1997 | Grieshop ..................... 414/526 |
| RE35,580 E | 8/1997 | Heider et al. ................. 298/24 |
| 5,655,872 A | 8/1997 | Plotkin ........................ 414/526 |
| 5,785,481 A | 7/1998 | Ockels ........................ 414/523 |
| 5,788,055 A | 8/1998 | Stewart et al. .............. 198/671 |
| 6,113,339 A * | 9/2000 | Adams ........................ 414/505 |

* cited by examiner

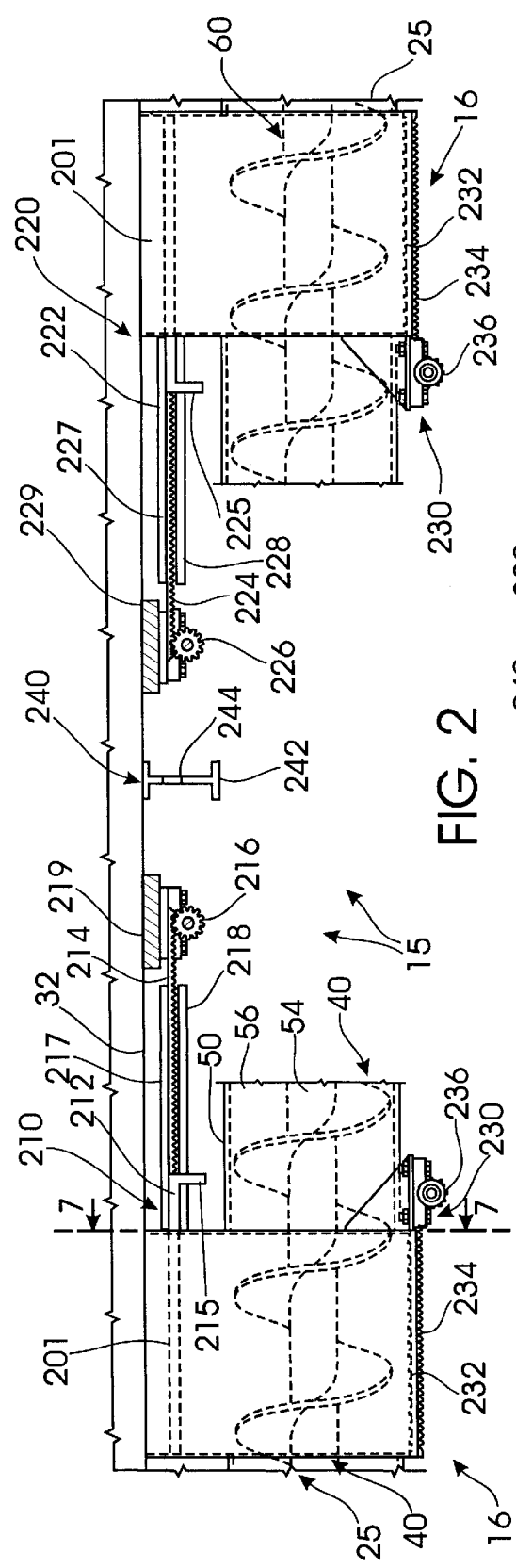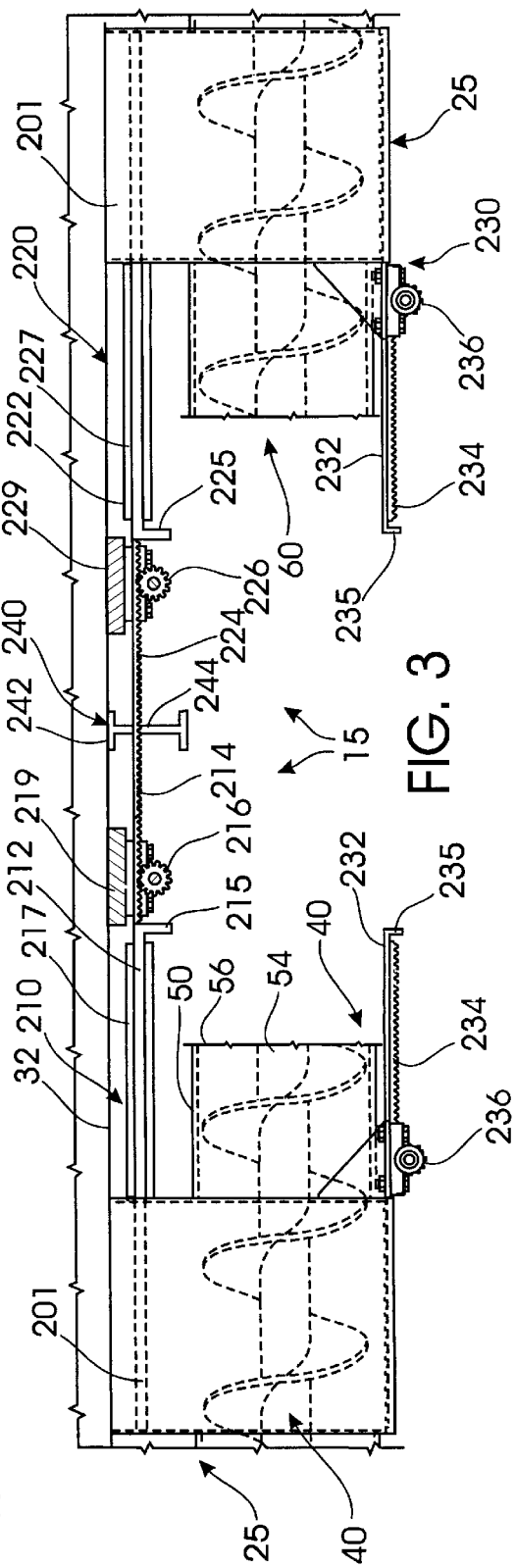

DISCHARGE SYSTEM WITH DUAL DOORS AND INTERMEDIATE AUGER

This application is a divisional application based on patent application Ser. No. 09/086,691, filed May 28, 1998 now U.S. Pat. No. 6,129,499, and entitled IMPROVED DISCHARGE SYSTEM WITH DUAL DOORS AND INTERMEDIATE AUGER.

REFERENCE TO MICROFICHE APPENDIX

This application is not referenced in any microfiche appendix.

BACKGROUND OF THE INVENTION

1. Field of the Invention

The present invention relates generally to disbursement systems for bulk material storage receptacles for fertilizers and the like. More particularly, the present invention relates to an improved disbursement system with dual doors and an intermediate auger for a tender trailer wherein the bulk material may be selectively dispensed via gravitational discharge or remotely via an intermediate auger system. Known related prior art may be found in U.S. class 222, subclass 561, class 241, subclass 73 and class 298, subclasses 24 and 27 and others.

2. Description of Prior Art

Known bulk material storage receptacle utilize various devices for unloading their cargo. These unloading devices are generally either a conveyor system for remotely transporting and subsequently disbursing the cargo or a gravity dump system. The former typically comprises a series of auger transporters for moving the cargo to the receptacle periphery while the latter typically comprises a gravitationally fed door for dumping the cargo onto the ground immediately below the receptacle.

Auger systems generally pivot between a transport or stowed position and a delivery or discharge position. During transport, a portion of the auger is generally positioned alongside the longitudinal axis of the tender while that portion pivots to another position (i.e., transverse to the tender) for unloading the tender during material discharge.

Gravitational systems are often preferred by operators for several reasons. For example, they are typically much quicker to unload than augering systems because of their larger throughput capacities. Also, auger systems usually require more maintenance and/or care during use. However, gravitational systems have limitations. For example, they only unload beneath the trailer. Also, because they depend on the force of gravity to disburse their cargo, they may become plugged and/or bridge, causing the cargo to become lodged in the trailer.

While the present invention may be utilized with fixed or permanent storage receptacles, it is particularly well suited for use with mobile bulk material tenders. Bulk material tenders of the type contemplated for use with the invention generally deliver large amounts of particulate material, usually in the range of 10 to 40 tons in a single load. This material is typically discharged by the auger system at rates approaching 4,000 lbs/min. When the gravity doors are used, the discharge rate is on the order of a couple of minutes. Even though large loads are the norm, the auger system usually unloads the tender quicker than the operator can properly position the auger system for discharge.

As will be appreciated by those skilled in the art, it is critical to efficiently and effectively position the discharge auger tubes for unloading, while providing suitable communication for the material between the tender and the discharge auger. The known prior art have utilized articulating or multi-sectioned auger tubes that are disassembled for stowing and must be reassembled for discharge. Reassembling or disassembling augers is time consuming and labor intensive, especially given the time requirements for unloading the tender with the auger system. Other types of prior art devices provide auger systems that are otherwise unduly complex, many having multiple sections that pivot or otherwise move in multiple axes. These complicated auger systems do not normally improve the overall quality of the material delivery but rather add to the costs for such delivery.

Several examples of overly complex devices are shown in the prior art, including U.S. Pat. Nos. 2,877,914, 3,326,397, and 4,613,275, all of which are of general relevance. Other complex, though interesting, devices are shown in U.S. Pat. Nos. 3,642,155 and 3,770,101, both to Carson. The Carson devices both appear to comprise an articulated unloading boom hinged to one end of a transport body for movement between a travel position and an unloading position. In the travel position, the boom is unfolded against one side of the body while the hinged boom sections are aligned in the unloading position. The boom comprises an upper section and a lower section pivotally joined by a hinge. A hydraulic actuator rotates the upper section between its travel position and its aligned unloading position relative to the lower section.

Another interesting device is shown in U.S. Pat. No. 4,093,087 to DeCoene. That patent shows a system for moving an unloading auger tube having a main segment and an end segment between the transport position and a selected unloading position. The end segment is angled with respect to the main segment and it is pivotally mounted on a lower inclined portion of a side wall so as to extend away from the central, vertical fore aft plane of the vehicle. The auger segments are disposed at predetermined angles to facilitate auger pivoting about a single axis located perpendicular to the inclined mounting surface of the side wall for movement between the stowed discharge positions.

Another overly complex device is shown U.S. Pat. No. 4,613,275 to Karlowski. The Karlowski patent shows an articulated support arrangement for attaching an auger system to a side wall of a truck. This arrangement permits the auger to move between a storage position against the side wall to an operating position parallel to the truck rear. The auger conveyor is supported by a swingable material conveyor support. The support includes a pivot arm moving arcuately about a hinge with a terminal clamp intermediately securing the arm to the auger conveyor. The clamp pivots about a second hinge and third hinge to enable the auger conveyor to pivot about multiple axes when moving between its storage and operating positions. Other patents showing complex devices of generally lesser relevance include U.S. Pat. Nos. 3,322,257 3,391,778, 3,638,816, 4,218,169, 4,419,037, 5,520,495 and 5,615,990.

While the above mentioned prior art devices are generally too complicated for efficient practical use, several simplistic devices are also known in the art. These devices typically require little time for conversion between the transport position and the delivery position. For example, U.S. Pat. No. 4,742,938 to Niewold shows a positioned mechanism for an auger in which the auger is hydraulically swung between its transport and working positions. The auger tube is mounted at its lower end by a swivel to a wall of a hopper, permitting the auger tube to swing into place via a hydraulic cylinder.

Similarly, U.S. Pat. Nos. 4,427,105, 5,108,249, 5,538,388 and 5,655,872 all show devices that pivot between a transport and working position via a hydraulic cylinder and a terminally hinged auger tube. However, all of these devices pivot about a terminal hinge. In other words, the hinge is located at the end of the tube.

A very interesting device is shown in U.S. Pat. No. 5,468,113 to Davis. Davis shows an auger that pivots in multiple axes about an intermediary point proximate one end. Apparently, the auger moves between the transport and delivery positions by pivoting about a first pivotal mount that cooperates with a second pivotal mount. When in the delivery position, the auger maintains dust-free communication with the storage receptacle.

A typical prior art gravity dump system is shown in U.S. Pat. No. 4,009,906. This patent shows a conventional gravity dump system with two hoppers with a centrally located discharge door.

Another typical door construction is shown in U.S. Pat. No. 3,938,861, wherein the door consists of a rack and pinion system for moving the door for discharging cargo. Similar system is shown in U.S. Pat. No. 4,475,672.

A gravity feed hopper system that utilizes an auger to commute materials before discharge is shown in U.S. Pat. No. 5,395,058. This device crushes large aggregate materials so that they may flow more freely from the hopper.

U.S. Pat. No. 4,617,868 shows a rail car that utilizes multiple hoppers with multiple doors. An interesting "sanitary" plate is shown which protects the hopper door opening from contamination.

A conventional hopper bottom trailer is shown in U.S. Pat. No. Re. 35,580. The trailer shown therein has hopper doors that gravitationally dispense the bulk materials therefrom. Another patent of general interest is U.S. Pat. No. 5,224,761, wherein another trailer with a gravitational system of general relevance is shown.

However, the known prior art fails to advantageously combine the desirable attributes of an auger system with the gravitational discharge system to achieve the desirable attributes of both systems. A few enterprising individuals have discovered that these systems can be combined sometimes. For example, when a pivoting auger forms a portion of the auger system, an operator can often leave the pivoting auger uncoupled so that the cargo is dumped at the coupling juncture, normally at the rear of the tender trailer. Unfortunately, this is not always a practical solution and fails to provide the speed of gravitational systems while suffering from the disadvantage of the auger system.

The known prior art fails to provide an efficient discharge system for unloading bulk material tenders. Known prior art auger systems suffer from problems associated with efficient and practical conversion between the stowed and discharge positions while avoiding unnecessarily structurally instable pivotal couplings. Known multiple segmented or articulated pivoting auger systems are usually difficult and time consuming to convert between stowed and discharge positions. Further, known prior art devices with auger systems that pivot in multiple axes during conversion between stowed and discharge positions often require experienced operators to properly position the auger system. Prior art devices using couplings having terminal hinges or cylinders are inherently instable because the entire weight of the auger is pivoted about a terminus. In particular, no known prior art device distributes the stresses generated during the conversion of the auger system between its stowed and discharge positions adequately.

Thus, a desirable improvement to the art would be an auger system for a tender that enabled an unskilled operator to quickly and efficiently convert the system between a stowed and a discharge position. A particularly desirable improvement would be an auger system that adequately distributed stresses generated during auger conversion.

SUMMARY OF THE INVENTION

My improved system overcomes the above referenced problems associated with the known prior art. It comprises a dual door hopper with an intermediate auger. The auger system is particularly well adapted for use with a conventional fertilizer tender trailer with multiple storage bins wherein each bin dispenses stored particulate materials through an orifice on the lowermost section or bottom of the bin. The preferred auger system comprises two discrete sections that may be selectively coupled by selectively pivoting the second section into receptive contact with the first section.

The dual doors an operator to select between permit gravitational dispensing the bulk or remotely disbursing the bulk material through the associated auger system.

The preferred embodiment comprises a tender trailer with centrally placed gravitational disbursing doors. An upper door seals the hopper and an intermediary auger is preferably located between the upper and lower doors.

In use, the upper door can be opened to permit bulk material to flow into the associated auger system. The dispensed material may then be transported through the auger system to a remote location for subsequent disbursement. Alternatively, the lower door may be opened and the dispensed material may be subsequently gravitationally disbursed beneath the trailer. The operator may selectively choose which dispensing mode the trailer operated in by choosing whether or not to open the lower door.

The first section comprises an elongated conveyor with spaced apart ends proximate the trailer front and rear respectively. Preferably, the conveyor is disposed beneath the bin bottom to receive the stored particulate materials as they are dispensed from the bin. The conveyor then moves the dispensed particulate materials, preferably to the receptacle periphery, for subsequent discharge therefrom. The conveyor comprises a cylindrical housing supporting a terminal hydraulic motor that rotates an internal screw auger that propels the dispensed particulate material along conveyor interior toward and through an output orifice.

The orifice outputs the dispensed material from the housing either upon the ground or, preferably, into the second section for subsequent discharge. The second section comprises a pivotable, elongated auger conveyor that arcuately moves between a stowed position and a discharge position. When in the stowed position, the auger transporter is substantially parallel to the trailer longitudinal axis. When in the discharge position, the auger transporter is substantially perpendicular to the trailer longitudinal axis with an end disposed beneath the transporter orifice to receive materials output therefrom. The auger transporter comprises a cylindrical housing supporting a terminal motor rotating an internal screw auger that propels materials therethrough to a discharge spout.

The first and second auger sections couple as a result of the selective actuation of an intermediate pivot assembly. The pivot assembly comprises a concentric sleeve that circumscribes an intermediate portion of the auger transporter to secure a conventional hydraulic cylinder and a hinge thereto. The reinforcing sleeve comprises a rigid cylinder that concentrically extends along an intermediate portion of the auger transporter and is secured thereto. The cylinder defines a flange at one end that facilitates the connection of the conventional hydraulic cylinder thereto. The hydraulic cylinder is anchored to the trailer frame at its other end. The hydraulic cylinder moves the auger transporter through an arc defined by the hinge assembly between the stowed and discharge positions. The hinge comprises a sleeve circumscribing collar that is secured to the auger transporter opposite the hydraulic cylinder. The collar defines an integral base that is journalled between an upper trunnion and a lower trunnion by a roll pin for rotational movement. Preferably, the upper trunnion is elevated above the lower trunnion so that the pivot axis established by the roll pin is offset above the horizontal plane established by the trailer frame by an offset angle. The offset angle may be between 30 and 60° but is preferably 45°.

Preferably, the hydraulic cylinder and collar are anchored to the frame proximate one another so that only a small section of frame need be strategically reinforced to accommodate the additional stresses exerted by the auger transporter during pivotal movement. The coextensive rigid cylinder serves to dissipate stresses experienced by the auger transporter during pivoting along a significant portion of the auger transporter.

During transportation, the auger system is uncoupled and the second section is stowed adjacent the bin and parallel to the longitudinal axis of the trailer. During discharge operation, the tender trailer delivers its stored particulate material to a selected location. The operator couples the discrete auger sections by pivoting the second section into receptive contact with the first section by manipulating a remote engine and control system. As the hydraulic cylinder secured to the sleeve extends, it pushes against the frame to raise the auger transporter from its horizontal stowed position arcuately 90° into a vertically elevated and laterally displaced discharge position that lies in a plane perpendicular to the horizontal plane defined by the trailer frame.

Thus, a primary object of the present invention is to provide an improved auger system that may be converted between its stowed and discharge positions by relatively unskilled operators.

A basic object of the invention is to increase delivery efficiency in bulk material tenders to reduce costs.

Another basic object of the present invention is to provide an auger system that distributes stresses generated during the conversion between a stowed and a discharge position.

A related object of the invention is to provide an improved auger system that promotes efficient operation in conjunction with increased longevity by distributing rotational stresses over a substantial portion of the system.

Another object of the invention is to restrict auger system rotation to a single axis while distributing stress generated during rotation through a significant portion of the system.

BRIEF DESCRIPTION OF THE SEVERAL VIEWS OF THE DRAWING

FIG. 2 is a partially fragmented side elevational view, showing the invention with the upper and the lower doors closed;

FIG. 3 is a partially fragmented side elevational view similar to FIG. 2, but showing the invention with the upper and lower doors open;

DETAILED DESCRIPTION OF THE INVENTION

Figure 1:
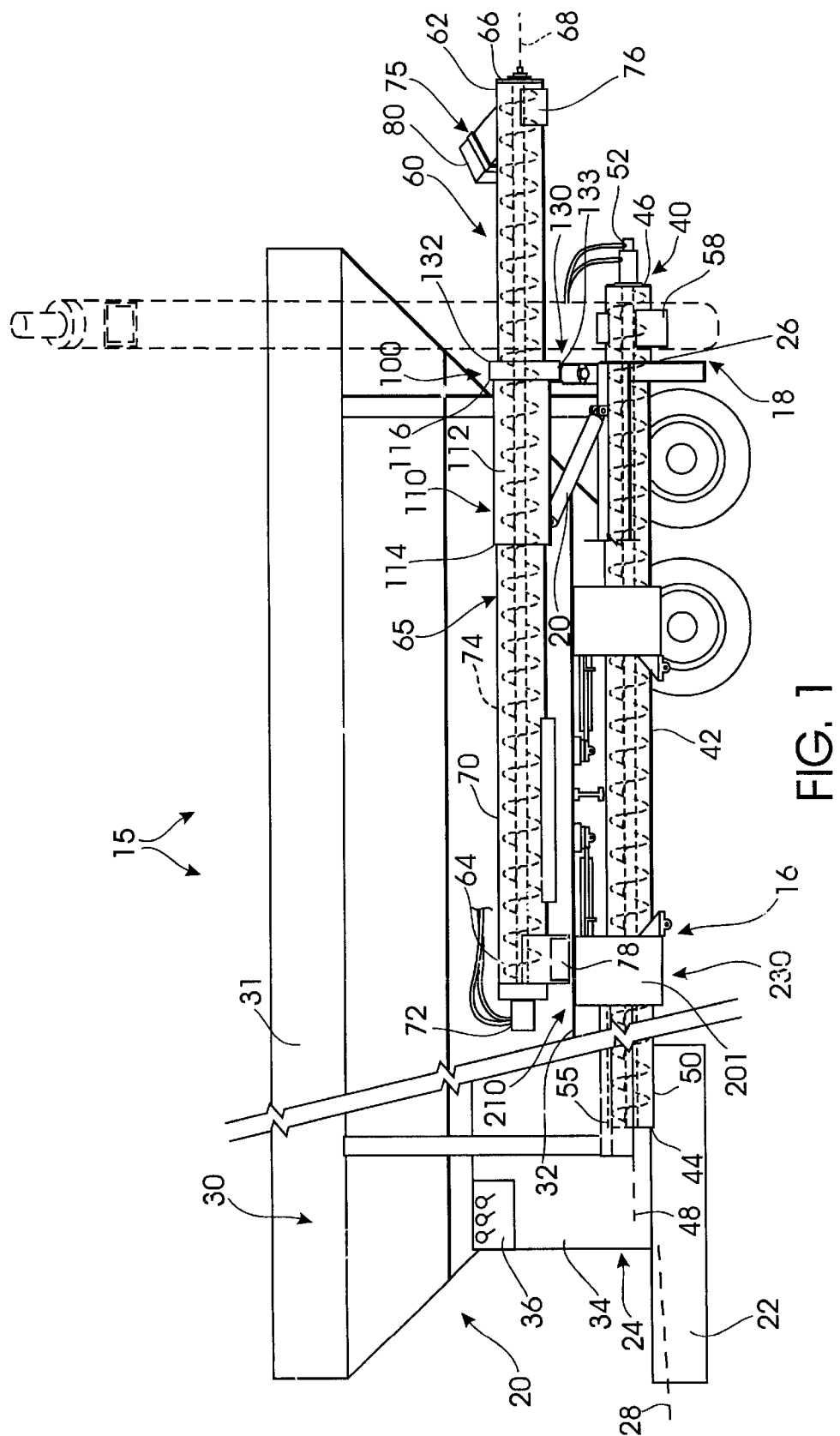
FIG. 1 is a partially fragmented environmental view with pieces omitted or fragmented for clarity, showing a preferred embodiment of my improved disbursement system with dual doors and intermediate auger installed on a conventional tender trailer.

My improved discharge system with dual doors and intermediate auger system is generally designated by reference numeral 15 in FIGS. 1–7. The improved system 15 may be used with any type of storage receptacle although it is particularly well adapted for use with conventional temporary storage bins mounted on a mobile platform. Contemplated mobile platforms the system 15 may be mounted upon include barges and other maritime vessels, railcars, conventional motorized vehicles, especially fertilizer trucks, and trailers drawn by draft vehicles, especially fertilizer tender trailers. Ideally discharge system 15 comprises a gravitational system 16 combined with a pivoting auger system 18.

An exemplary embodiment of the invention is shown in FIG. 1 wherein the disbursement system 15 is associated with a mobile trailer 20 that has at least one storage receptacle 30 adapted to dispense particulate material therefrom. In another exemplary embodiment, trailer 20 comprises a conventional fertilizer tender trailer supporting a receptacle that comprises multiple storage bins wherein each bin dispenses stored particulate materials through an orifice on the lowermost section or bottom of the bin. Of course, the particulate materials may be fertilizer or any other type of particulate material, including sand, gravel and the like, so long as the material is dispensable from the receptacle.

A conventional tender trailer generally comprises a wheeled frame 22 that is between 28 and 56 feet in length and approximately 8 feet in width. The frame 22 is adapted to be coupled to and drawn by a conventional draft vehicle (not shown). The frame supports at least one receptacle 30 that is adapted to temporarily receive and store particulate material. Ideally, the preferred tender trailer 20 is approximately 48 feet in length with three abutting bins supported thereon.

Normally, the receptacle 30 comprises at least one bin 31. Bin 31 generally comprises a hollow shell measuring 14 feet in length by 8 feet in width by 8 feet in depth. Of course, if practical dimensional requirements demand, bin 31 can be larger or several bins may be installed in an abutting manner as desired to fit a particular trailer configuration. A conventional bin design acceptable for use with the invention has an inverted pentagonal cross-section so that materials can be deposited into the bin through its top for temporary storage and then they can be dispensed from the bin bottom via gravitational flow.

In use, the discharge system 15 unloads the trailer 20 by dispensing the stored particulate material in bin 31 to a selected location, either beneath the trailer via gravitational system 16 or at the trailer periphery via auger system 18. The operator may select where to discharge the particulate materials depending upon the particular operational parameters of the receiving locale. The operator may select discharge through the gravitational system 16 by simply opening both upper and lower doors. Subsequent discharge will be directly beneath the trailer 20, as will be discussed hereinafter. Selection of the auger system 18 entails that the operator open the upper door and activate the auger system to discharge at the trailer periphery. In both cases, gravitational system 16 supplies auger system 18 as will be discussed hereinafter.

Auger system 18 is preferably remotely powered by an internal gasoline engine 34 or other acceptable power source that provides motive power. A preferred power unit comprises a 72 hp internal combustion engine. The motive power is transferred via conventional hydraulic tubing and controlled via valve bank 36. Preferably, the auger system 18 comprises discrete sections 40 and 60 that may be selectively coupled by operation of a hinge element 100.

The first section 40 comprises an elongated conveyor 42 with spaced apart ends 44 and 46. Preferably, end 44 is proximate the trailer front 24 while end 46 is proximate the trailer rear 26. Thus, conveyor 42 traverses the longitudinal axis 28 of the trailer. Ideally, conveyor 42 is disposed beneath the lowermost bin portion or bottom 32 and it is appropriately orificed to permit the stored particulate materials to be dispensed therein. The conveyor 42 then moves the dispensed particulate materials for subsequent discharge from trailer 20.

The conveyor 42 preferably comprises a cylindrical housing 50 extending between ends 44 and 46. A hydraulic motor 52, driven by engine 34 and bank 36, adjacent end 46 rotates an internal screw auger 54 extending between ends 44 and 46 via an integral shaft and conventional coupling (not shown). The motor 52 and screw auger 54 are journalled to and inside the housing 50 by pillow bearings or the like (not shown) for rotation in the conventional manner. The housing top 55 preferably abuts bottom 32 and it is appropriately orificed as necessary to facilitate gravitational dispensing of the particulate material stored in bin 31. The dispensed material enters the housing interior 56 where it contacts the screw auger 54. During dispensing, motor 52 rotates screw auger 54, which subsequently propels the dispensed particulate material along interior 56 toward and through an output orifice 58.

Orifice 58 outputs the dispensed material from the housing 50 at the periphery of trailer 20. Preferably, orifice 58 is adjacent end 46 although it should be appreciated that it could be located elsewhere along housing 50. Regardless of the positioning of orifice 58, the output material is either deposited directly upon the ground 25 or, more preferably, it is deposited into the second section 60 for subsequent discharge.

The second section 60 comprises a pivotable elongated auger transporter 62 with spaced apart ends 64 and 66. Preferably section 60 is located on the left side of trailer 20 but section 60 could be secured on either or both sides of bin 31. The auger transporter 62 pivots between a stowed position and a discharge position (as indicated in FIG. 1). When in the stowed position, end 64 is proximate the trailer front 24 and conveyor end 44 while end 66 is proximate the trailer rear 26 and conveyor end 46. When in the discharge position, end 64 is vertically above the discharge location while end 66 couples to end 46 so that auger transporter 62 receives output materials from conveyor 42 for subsequent discharge from trailer 20. In other words, the auger transporter longitudinal axis 68 is substantially parallel with the longitudinal trailer axis 28 and longitudinal conveyor axis 48 (shown in FIG. 1) when stowed and the auger transporter longitudinal axis 68 lies in a plane perpendicular to trailer axis 28 and conveyor axis 48 when ready to discharge.

The auger transporter 62 preferably comprises a cylindrical housing 70 extending between ends 64 and 66. A hydraulic motor 72, driven by engine 34 and bank 36, adjacent end 64 rotates an internal screw auger 74 extending between ends 64 and 66 via an integral shaft and conventional coupling (not shown). Motor 72 and screw auger 74 are journalled to and inside housing 70 by pillow bearings or the like (not shown) for rotation in the conventional manner.

When positioned to discharge materials (as indicated by dashed lines in FIG. 1), the first and second sections 40, 60 are coupled so that an input hopper 75 receives the output material from orifice 58. Flexible flaps 80 upwardly extend from the hopper 75 to ensure that materials output from orifice 58 are directed into hopper 75. The output material then enters the housing interior 76 where it contacts the screw auger 74. During dispensing, motor 72 rotates screw auger 74, which subsequently propels the dispensed particulate material along interior 76 toward and through the discharge spout 78.

The first and second auger sections 40, 60 couple as a result of the selective actuation of the hinge element 100. The element 100 comprises a concentric sleeve 110 that circumscribes a portion of section 60 to secure a conventional hydraulic cylinder 120 and a hinge assembly 130 thereto.

The reinforcing sleeve 110 comprises a rigid cylinder 112 that concentrically extends along a portion of the auger transporter 62 and is secured thereto. Ideally, the rigid cylinder 112 integrally extends for approximately 4 feet along auger transporter 62. The ratio of sleeve length to transporter length should be between 1:4 and 1:5 to adequately distribute rotational stress. The rigid cylinder 112 has spaced apart ends 114 and 116 that are intermediately located between auger transporter ends 64 and 66. Ideally, sleeve end 116 is located at least 4 feet from auger transporter end 66 while end 114 is proximate the second section midpoint.

The end 114 defines a flange that facilitates the connection of the conventional hydraulic cylinder 120 thereto. The hydraulic cylinder 120 comprises a bore with an elongated, telescoping shaft. The shaft comprises a terminal yoke that couples to the flange via a pin. The bore defines a terminal flange protruding oppositely from the shaft that inserts between tabs that are anchored to the frame 22. The flange is coupled to these tabs via another pin. Thus, the hydraulic cylinder 120 may pivot at either the yoke or the flange as the shaft telescopically emerges from the bore during auger transporter pivoting.

The hinge assembly 130 comprises a collar 132 that is secured to auger transporter 62 adjacent end 116. Collar 132 defines an integral base 133 that is journalled between an upper trunnion and a lower trunnion for rotational movement by a pivot element, preferably a roll pin. The upper and lower trunnions are anchored to frame 22 proximate the tabs. Preferably, the upper trunnion is elevated above the plane of the lower trunnion so that the pivot axis established by roll pin is above the horizontal plane established by frame 22 by an offset angle. The offset angle may be between 30° and 60° but is preferably 45° for most configurations. Thus, the upper trunnion is elevated between 0.5 and 1.5 feet above the lower trunnion.

Since the tabs and the trunnions are proximate one another, only a small section of frame 22 need be strategically reinforced to accommodate the additional stresses exerted by the second section 60 during pivotal movement. Also the coextensive rigid cylinder 112 serves to dissipate stresses experienced by the second section 60 during pivoting along a significant portion of the auger transporter 62. The rigid cylinder 112 further decreases the rotational stresses experienced by the second section 60 during pivoting as a result of the placement of end 114 proximate the second section midpoint 65 and the placement of end 116 distally from auger transporter end 66.

As a further result of the placement of the tabs the upper and lower trunnions and sleeve 110, the shortest possible cylinder stroke is achieved (approximately 2 feet). In other words, the length of the telescoping shaft is believed to be as short as possible while also minimizing stresses on the second section 60 as a result of the configuration described herein.

Since the preferred tender trailer is approximately 48 feet in length, conveyor 42 should be approximately 30 feet in length while the auger transporter 62 would be approximately 18 feet in length. Of course, as the trailer length increases or decreases, the conveyor length would correspondingly increase or decrease. However, the auger transporter length should remain constant so that the discharge location remains constant. Regardless of the auger transporter length, the ratio of sleeve to transporter length should remain constant. In other words, the length of sleeve 112 should extend for between a quarter and a fifth of the auger transporter length to adequately distribute rotational stresses. Moreover, the offset angle should remain between 30 and 60° to permit the coupling movement of section 60 when pivoting between the stowed and discharge positions.

The gravitational system 16 preferably comprises an elongated discharge channel extending between an upper door 210 and lower door 230. The discharge channel 200 thus forms a vertically oriented chute 25 affixed to the hopper bottom 32 for dispensing the stored particulate materials.

The upper and lower doors 210 and 230 thus control particulate discharge though channel enabling the operator to select between discharging the particulate material via gravitational system 16 by opening the upper and lower doors 210 and 230 or via auger system 16 by opening the upper door 210 only.

Preferably, chute 25 intersects conveyor 40 to form a communication juncture between conveyor 40 and hopper bottom 32. In this manner, the particulate material stored in the bin 31 may be transferred through chute 25 to permit the selective disbursement of the particulate material from bin 31. As mentioned hereinabove, the channel provides communication from the bin 31 to the gravitational systems 16 and the pivoting auger system 18.

The gravitational system 16 facilitates the flow of particulate material from the storage receptacle 30 via a dispensing chute 25 that also selectively dispenses particulate material into the auger system 18.

Chute 25 comprises a preferably stainless steel exterior 201 with a preferably inverted, truncated triangular cross-section. That is, the upper section is wider than the lower section of the chute. Preferably, the chute 25 extends integrally between an upper door 210 and a lower door 230 spaced apart therefrom.

Upper door 210 comprises a flat plate 212 that extends across the top portion of chute. Plate 212 can be used to seal the upper end of chute. Plate 212 is moved via a rack 214 driven by a pinion 216. The pinion 216 is secured to a support base 218 secured to the hopper bottom 32. When actuated, the pinion rotates to move the rack 214 and plate 212 accordingly. A transfer stop 215 limits the movement of the plate 212.

The spaced apart bottom door 230 operates similarly to the upper door 210. Door 230 comprises a plate 232 with an integral rack 234. Plate 232 can extend across the lower portion of chute to block particulate material from exiting through the gravitational system 16. Plate 232 uses an integral rack 234 driven by a pinion 236 to move between its open and closed positions. A stop 235 limits the plate movement.

Each chute 25 can be facing so that the racks 216 and 236 move the plates 212 and 232 toward the front of the trailer or the rear of the trailer. Also, the chutes 25 can be placed in opposing relationship so that the controls may be located in proximity to one another. In the preferred embodiment, at least two chutes are used and these chutes are preferably in proximity. When the chutes 25 are closely spaced, an overlapping rack arrangement can be employed to accommodate space constraints.

In the preferred embodiment, the trailer support beam 240 is appropriately orificed to receive appropriately interlocking racks. The I beam 242 defines a receptive orifice 244 to accommodate racks 214.

Upper and lower guides 217, 218 maintain rack alignment with chute 25. Preferably, plate 212 is perpendicular to the chute 25 although this is not necessary and other angular configurations are possible.

In the preferred embodiment, with oppositely oriented, closely spaced front and rear chutes 25 are identical except for orientation and the offset of racks 214 and 224. Thus, the rear chute 25 comprises a upper door 220 with a plate 222. Plate 222 is moved via rack 224 driven by pinion 226 with limiting stop 225. Rack 224 moves along guides 227, 228 while pinion 286 is anchored by base 229.

Figure 4:
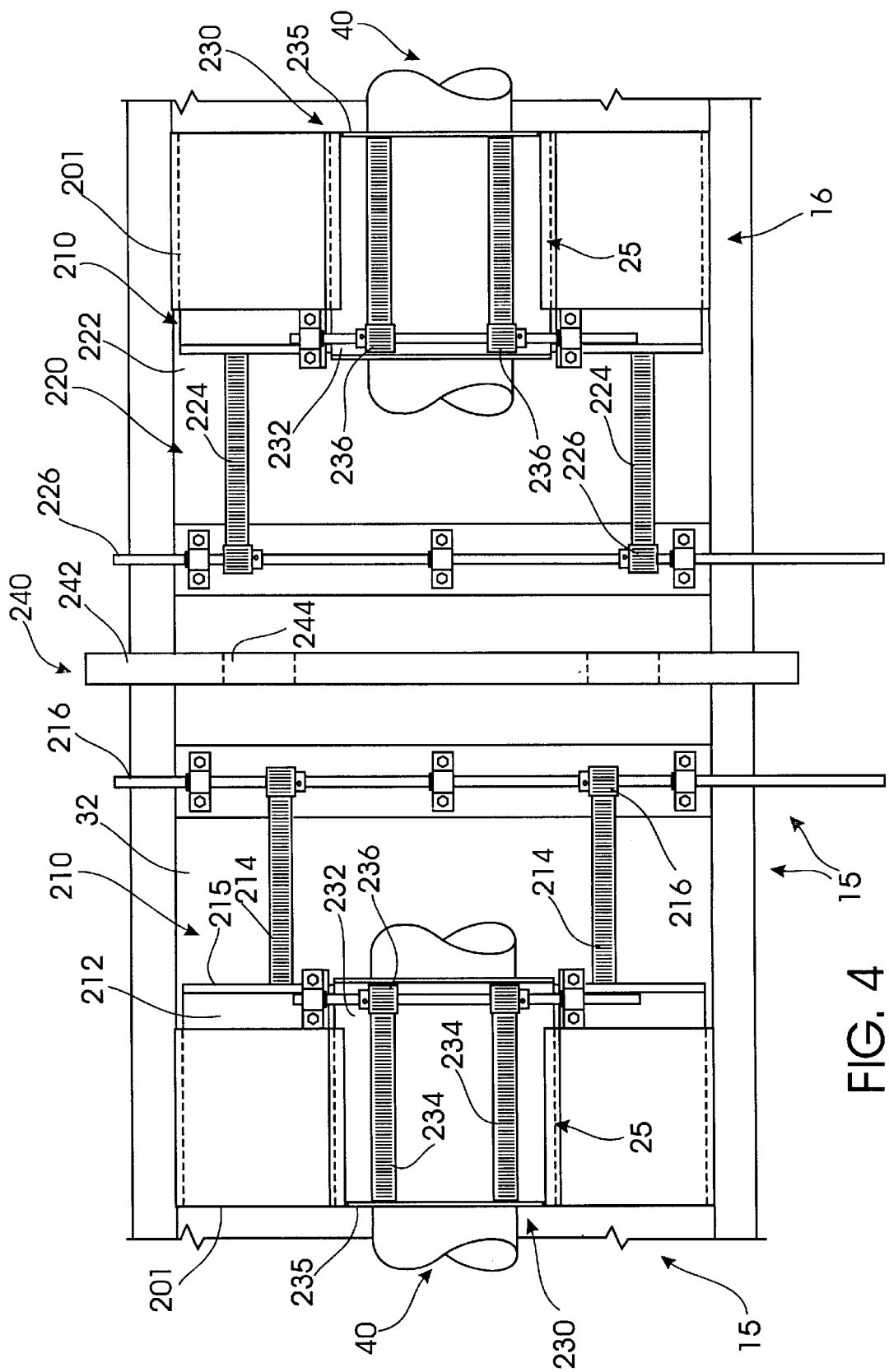
FIG. 4 is a bottom plan view, with the upper and lower doors closed and with the intermediate auger broken away.
Figure 5:
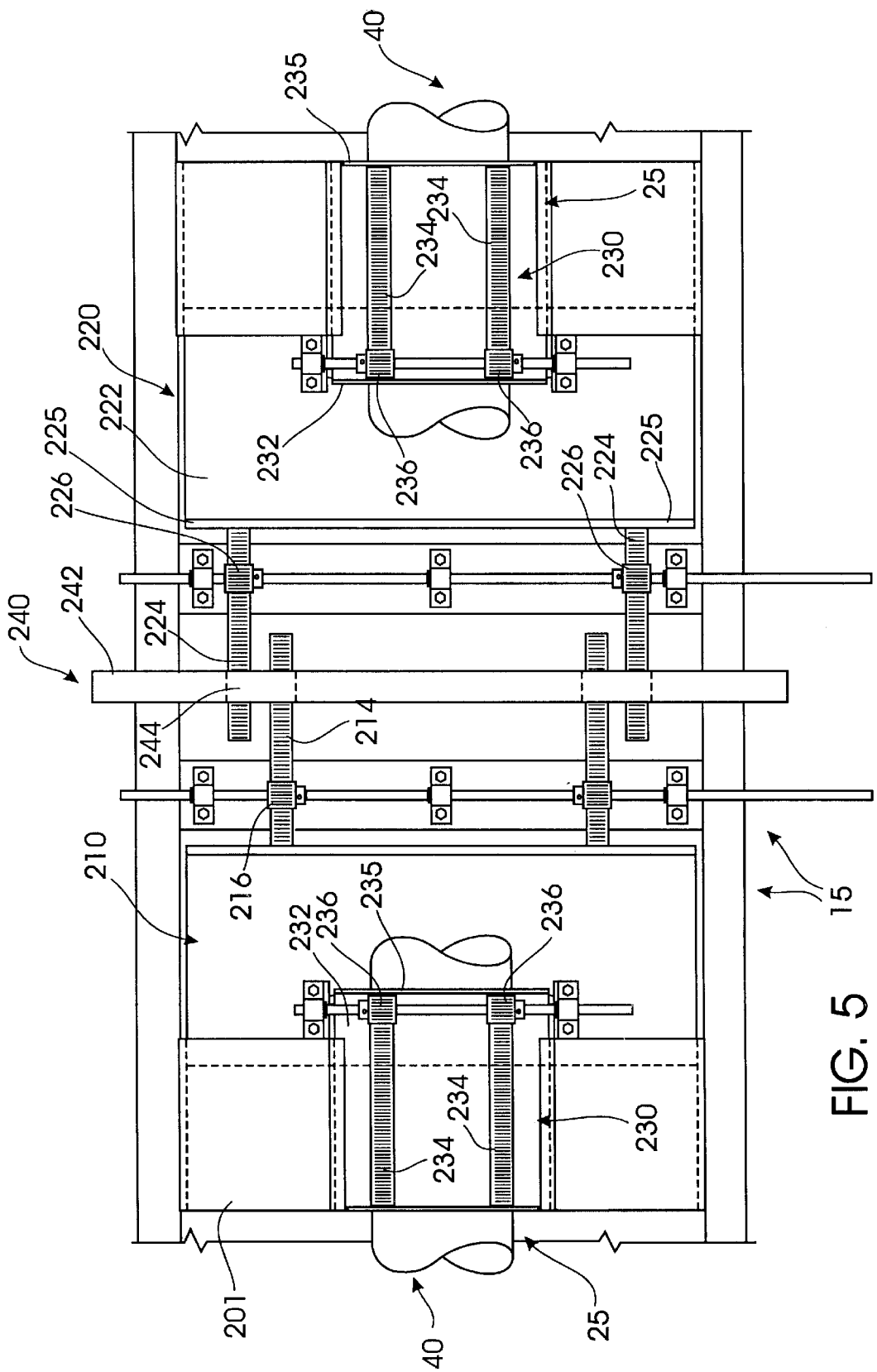
FIG. 5 is a bottom plan view similar to FIG. 4 with the upper doors open and the lower doors closed and with the intermediate auger broken away.
Figure 6:
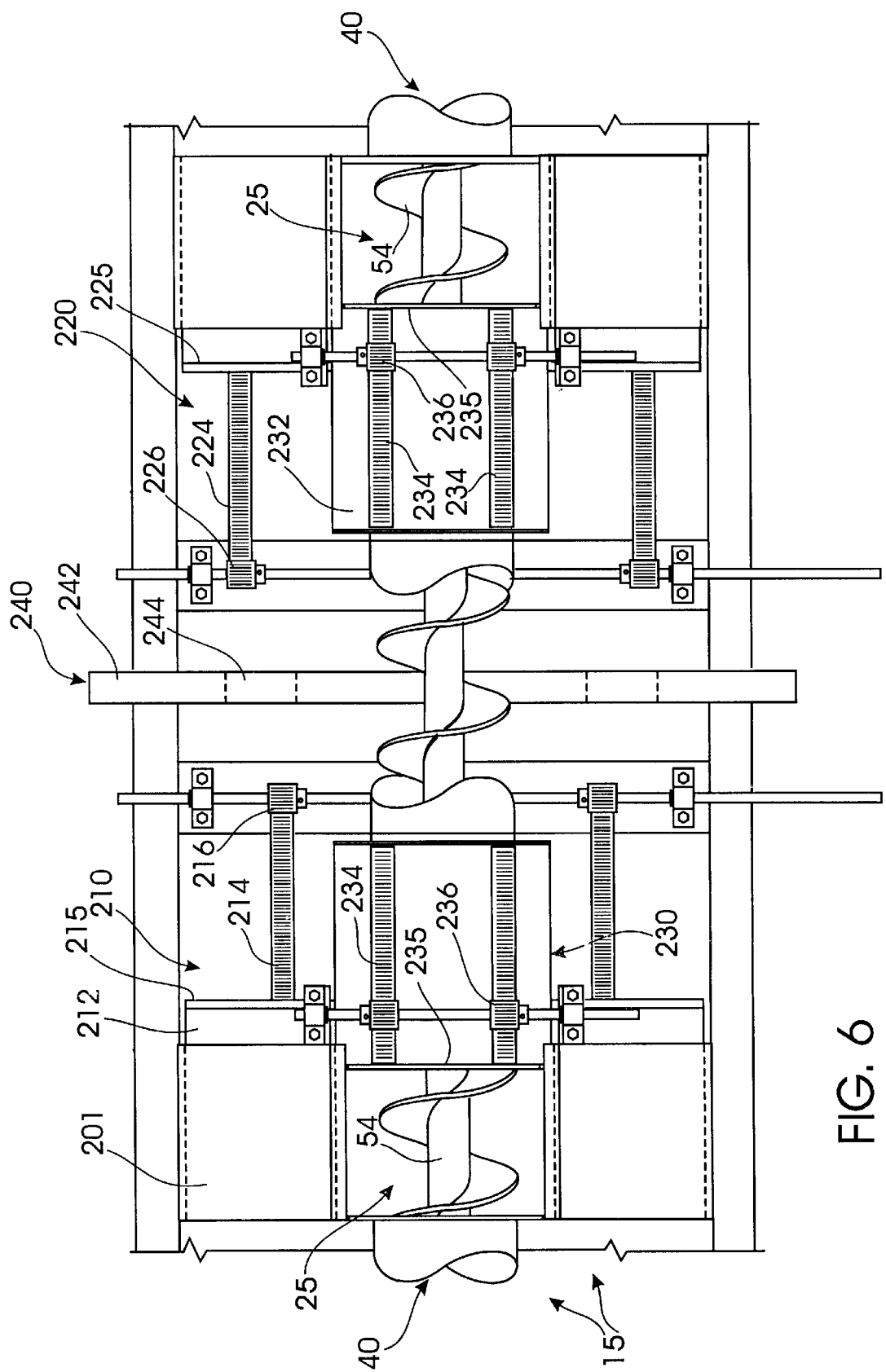
FIG. 6 is a bottom plan view similar to FIGS. 4 and 5, but with the upper doors closed and the lower doors open with the auger housing broken away; and, FIG. 7 is a cross-sectional view taken along line 7—7 in FIG. 2.
Figure 7:
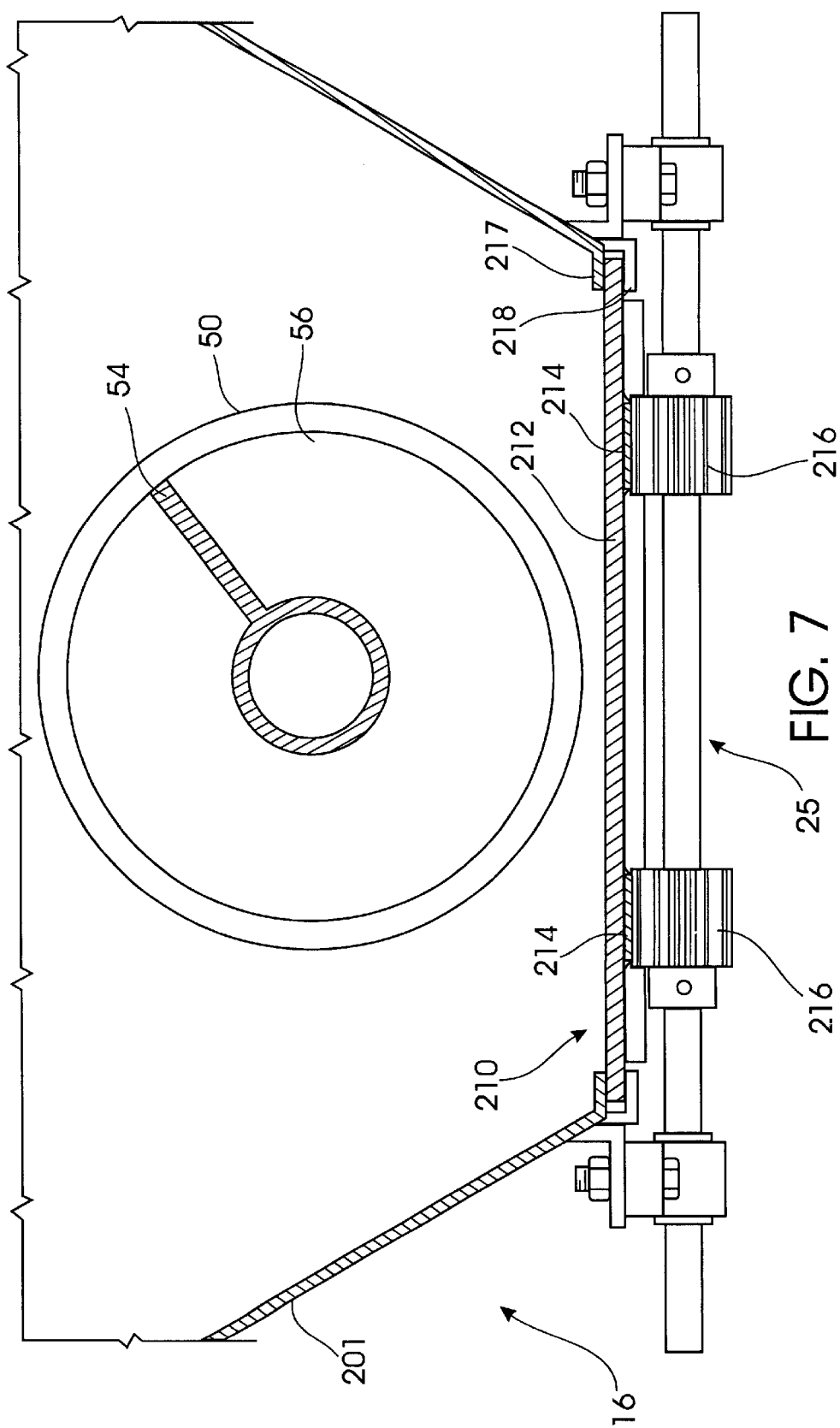

FIG. 4 shows the offset character of racks 214 and 224. When both are extended so that the door plates 212 and 222 are withdrawn from the chute, they overlap in beam 240 (as is shown in FIG. 5).

In order to accommodate the pinion 216 and 226, the base 219 and 229 must be spaced from the chutes 25. Thus, working distance permits pinion to be serviced and are actuated as necessary. Since the lower doors 230 must not comply with the same operational constraints as the upper door, they are identical and need not be offset.

During transportation, the auger system 15 is uncoupled and the second section 60 is stowed adjacent bin 31 as shown in FIG. 1. During discharge operation, the tender trailer delivers its stored particulate material to a selected location. The operator may selectively discharge material through either orifice 58 or spout 78. However, the commonly preferred manner of discharging material is through spout 78. In this manner, the discharged material can be deposited at an elevated height and at a distance from the tender trailer for deposit into bins or other receptacles.

The operator pivots section 60 into the appropriate coupling arrangement via bank 36. As the hydraulic cylinder 120 extends, it pushes against the tabs, which raises auger transporter end 64 from its horizontal position arcuately. As auger transporter end 64 raises, the opposite auger transporter end 66 is simultaneously lowered toward orifice 58 arcuately. At the zenith of hydraulic cylinder 120 with the shaft fully extended, the auger transporter 62 has moved from a stowed position defining a substantially horizontal plane co-planar to the horizontal plane defined by frame 22 to a discharge position defining a substantially vertical plane that is perpendicular to the horizontal plane.

Whereas, the present invention has been described in relation to the drawings attached hereto, it should be understood that other and further modifications, apart from those shown or suggested herein, may be made within the spirit and scope of this invention.

What is claimed is:

1. A system for discharging particulate material from a storage bin, said system comprising:

an upper door forming a portion of the bottom of said bin, said upper door being adapted to move to an open position to dispense said particulate material;

a lower door adapted to selectively discharge said dispensed particulate material exteriorly of said bin and directly beneath said bin;

an integral chute extending between said upper door and said lower door to establish fluid flow communication, said chute channeling said dispensed particulate material downwardly from said upper door;

an intermediate auger disposed across said chute, said intermediate auger adapted to selectively move said dispensed particulate material to a terminus for subsequent discharge exteriorly of said bin and at the periphery of said bin; and, a pivotable elongated auger transporter with spaced apart ends having a hinge element for pivotally mounting said elongated auger transporter in proximity to said intermediate auger, said hinge element including:

a sleeve engaging a portion of said auger transporter between said spaced apart ends;

a pivot element associated with said sleeve and pivotally securing said sleeve with respect to said storage receptacle; and, an actuator for pivoting said sleeve about said pivot element to move said pivotable elongated auger transporter between a generally horizontal stowed position and a partially upright deployed position with one of said spaced apart ends in proximity to said intermediate auger terminus to receive dispensed particulate material from said intermediate auger and subsequently transport the dispensed particulate material away from said bin periphery for subsequent discharge.

2. The system as recited in claim 1 wherein said auger transporter is adapted to be disposed in either a stowed substantially horizontal position adjacent said receptacle or deployed in a partially upright position wherein one of said auger transporter ends is proximate said terminal portion.

3. The system as recited in claim 1 further comprising control means for permitting selective discharge of said dispensed material through said lower door or said intermediate auger or said auger transporter.

4. The system as recited in claim 3 wherein said auger transporter is adapted to be disposed in either a stowed substantially horizontal position adjacent said receptacle or deployed in a partially upright position and one of said auger transporter ends is proximate said terminal portion.

\* \* \* \* \*